Oct. 23, 1934.                B. SASSEN                1,978,390
                    PATTERN CONTROLLED MACHINE TOOL
                       Filed Oct. 10, 1932          3 Sheets-Sheet 1

Inventor
BERNARD SASSEN
By H. K. Parsons
           Attorney

Oct. 23, 1934.     B. SASSEN     1,978,390
PATTERN CONTROLLED MACHINE TOOL
Filed Oct. 10, 1932     3 Sheets-Sheet 2

Inventor
BERNARD SASSEN
By H.K. Parsons
Attorney

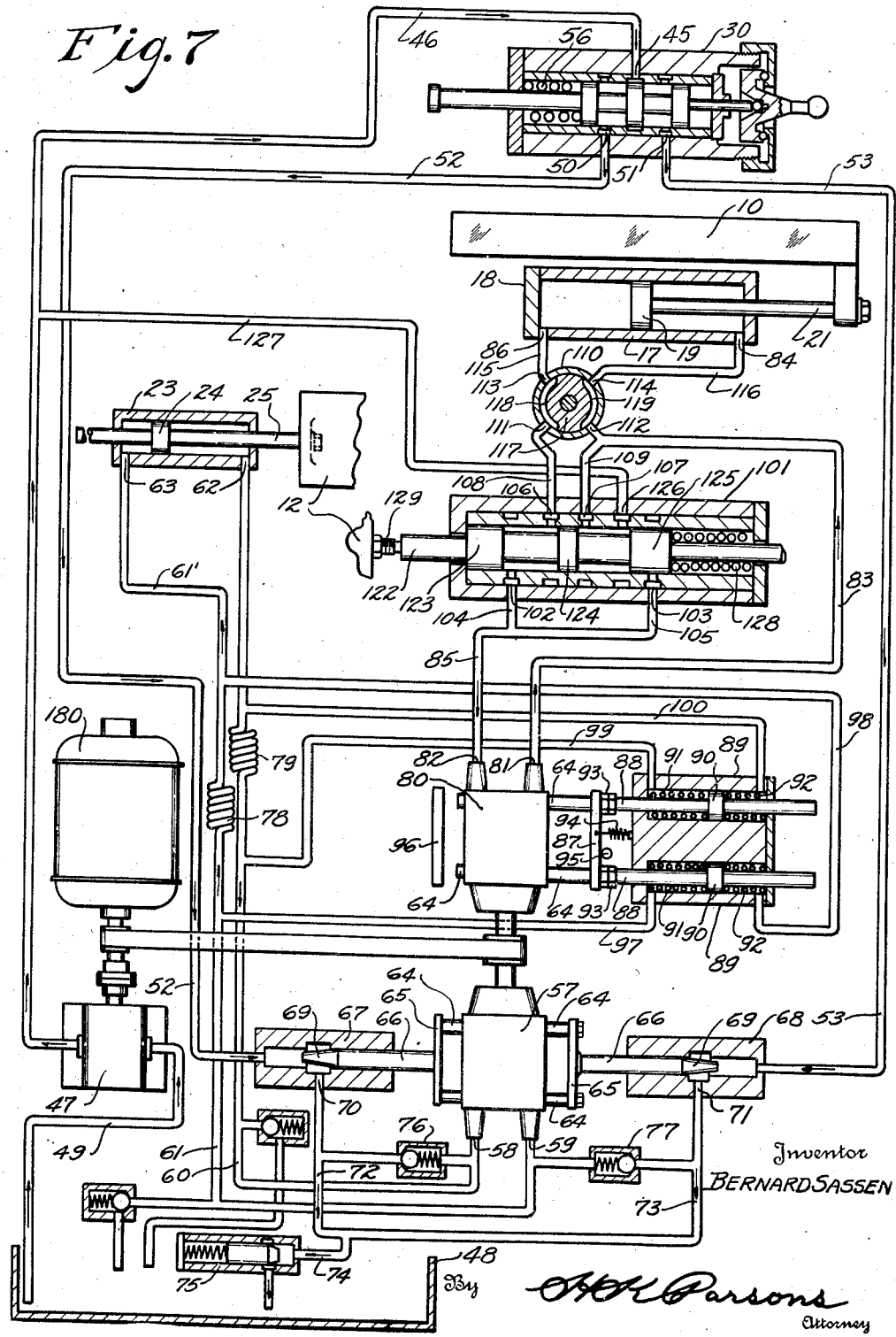

Patented Oct. 23, 1934

1,978,390

UNITED STATES PATENT OFFICE 1,978,390

PATTERN CONTROLLED MACHINE TOOL

Bernard Sassen, Cincinnati, Ohio, assignor to The Cincinnati Milling Machine Company, Cincinnati, Ohio, a corporation of Ohio Application October 10, 1932, Serial No. 636,963

30 Claims. (Cl. 90—13.5)

This invention relates to pattern controlled machine tools and more particularly to improvements in transmission and control mechanism therefor.

The chief purpose of pattern controlled machine tools is to produce relative movement between a cutter and work and to cause the path of said movement to deviate automatically in correspondence to the contour of a given pattern, and since this path is therefore irregular, the machine must have a certain universality of action through its angular range of operation, some machines being limited to 180° and others to 360°. Generally such machines are provided with two slides movable at right angles to each other, each slide having an individual final actuator, and the angle of resultant movement is effected in the following manner; energization of either actuator alone will cause movement in a primary direction which is determined by the guideways of the particular slide actuated, while movement in other than these two primary directions is effected by simultaneous energization of both actuators, the particular resultant direction being determined by the ratio of the velocities of the two slides. If the velocity of one slide is progressively decreased from maximum to zero, while the velocity of the other slide is simultaneously progressively increased from zero to maximum, the resultant direction of movement will progressively change through an angle of 90°.

In some fluid operated machines, each slide has its own actuating motor, but the motors are supplied from a common source of pressure which means that complicated valve control mechanism must be provided for dividing the flow between the motors and effecting movement thereof at different velocity ratios to obtain the various resultant angular directions desired.

It is therefore one of the objects of this invention to provide an improved circuit for operating the slide motors of a machine of the character described whereby simple valve control mechanism comprising only a relatively few parts may be utilized to control the same.

Another object of this invention is to provide separate operating circuits for the movable slides of a pattern controlled machine tool but under the control of one tracer, whereby each circuit may be designed to best suit the operating conditions of the particular part to be moved.

A further object of this invention is to provide improved tracer mechanism for controlling the direction of resultant movement of two operating slides of a pattern controlled machine tool, the rate and direction of movement of one slide being determined directly by the tracer and the rate and direction of movement of the other slide being determined from the rate of movement of the first slide.

Another object of this invention is to provide an improved pattern controlled machine tool which may be easily converted for use either as a profiling machine or as a diesinking machine.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims, without departing from or exceeding the spirit of the invention.

Referring to the drawings in which like reference characters indicate like or similar parts:

Figure 7 is a diagram of the hydraulic transmission and control mechanism of the machine.

Figures 1, 2, 3:
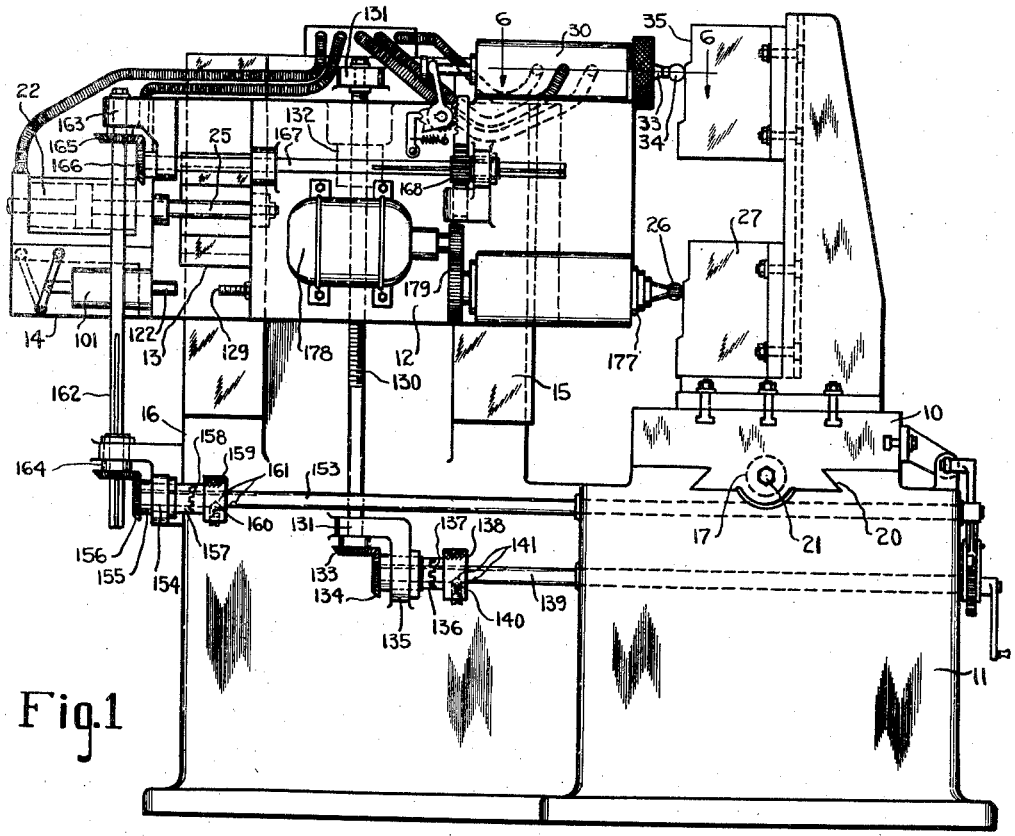
Figure 1 is an elevation of a machine tool embodying the principles of this invention.
Figure 2 is an enlarged detail of the automatic feed control mechanism.
Figure 3 is a detail view of the tracer control valve operating mechanism.
Figures 4, 5, 6:
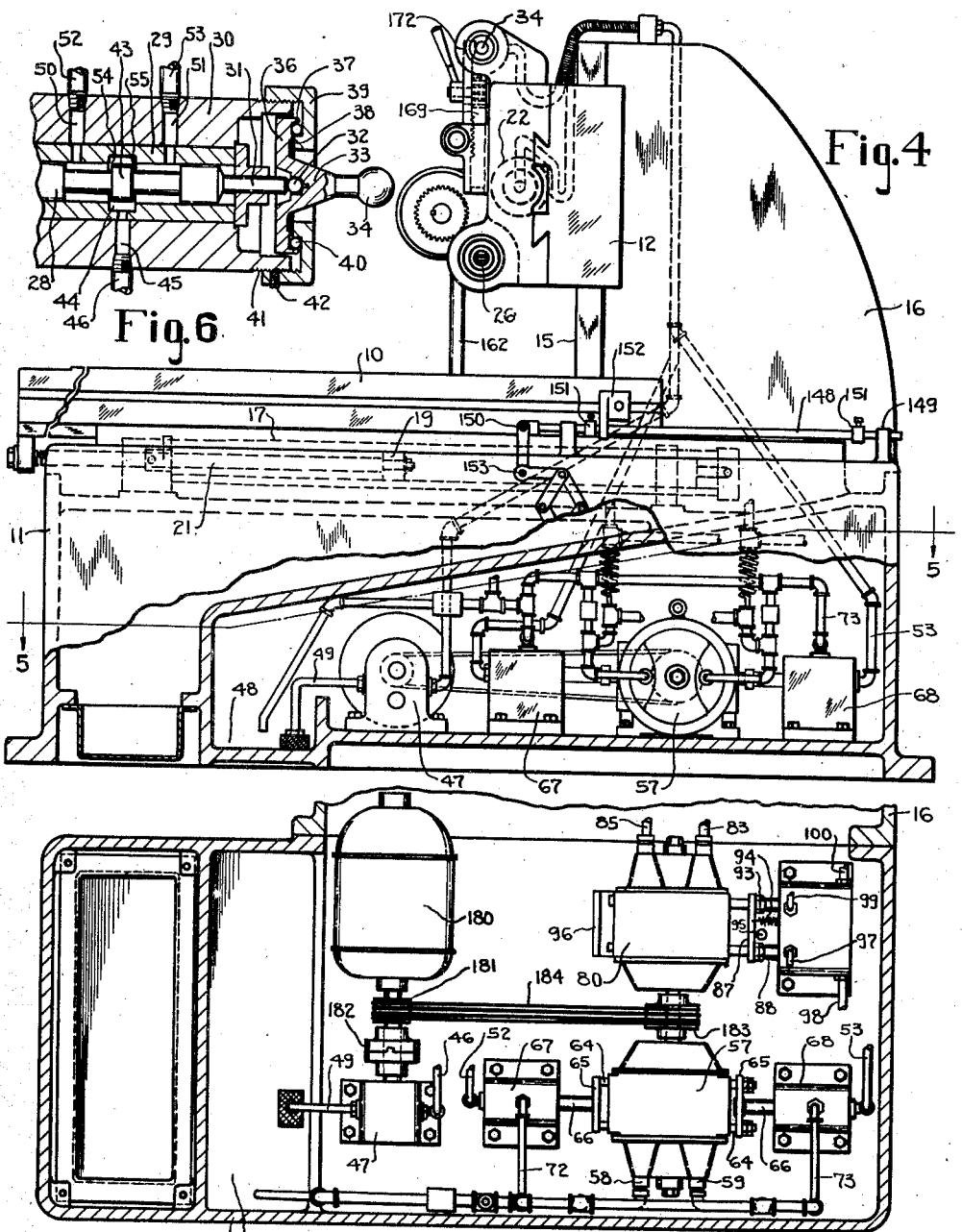
Figure 4 is an elevation of the machine as viewed from the right in Figure 1 and partially broken away to show the interior of the machine.
Figure 5 is a section on the line 5—5 of Figure 4.
Figure 6 is a section on the line 6—6 of Figure 1.

A pattern controlled machine tool embodying the principles of this invention is illustrated in Figures 1 and 4 and it has a pair of slides movable in paths normal to one another and at varying linear velocities, so that a resultant movement at any angle within its range may be effected as required by the pattern. Since these slides may be mounted for relative movement in various ways without departing from the principles of this invention, only one arrangement will be disclosed herein.

One movable slide, indicated by the reference numeral 10, is preferably mounted upon a base or support 11 for supporting the work; and a second slide 12 which may be utilized to carry a cutter and tracer is mounted for movement normal to the plane of movement of slide 10.

The slide 12 is reciprocably mounted on guideways 13 formed on a second slide 14, the latter being in turn reciprocably mounted upon guideways 15 formed on a column 16 extending upward from the side of the bed 11.

A motor 17 comprising a cylinder 18, Figure 7, and a contained piston 19 are provided for effecting reciprocation of the slide 10 in guideways 20 formed in the bed 11. The piston 19 is connected to the slide 10 by a piston rod 21 which extends through one end of the cylinder only, thereby providing a differential piston.

A second motor 22 is mounted on the slide 14 for reciprocating the slide 12 and comprises a cylinder 23 having a contained piston 24, the piston being connected to the slide by a piston rod 25. Attention is invited to the fact that the piston rod 25 extends through opposite ends of the cylinder 23 and in this respect differs from the motor 17.

In power operated pattern controlled milling machines, means must be provided for controlling the position of the cutter in accordance with the pattern to be duplicated, and in the present instance this is accomplished by means of an hydraulic tracer controlled mechanism which directly controls the operation of motor 22 and thereby the transverse position of cutter 26 relative to the axis of work 27 carried by slide 10. The cutter may be supported by the spindle 177 for rotation by a prime mover 178 carried by slide 12, through reduction gearing 179. The tracer mechanism, which is more particularly shown in Figure 6, comprises a reciprocable valve member 28 slidably mounted in a sleeve 29 fixed in the housing 30. The valve 28 has an extension 31 which engages an antifriction member 32 carried by the tracer arm 33. A tracer button 34 is secured to the end of the arm for engagement with a pattern 35 carried by the table. A circular plate 36 formed integral with the arm 33 has a projecting annular flange 37 cooperating with an annular flange 38 formed on the cover plate 39 for retaining anti-friction members such as balls 40 therebetween, the dimension of the flanges being less than the diameter of the balls so that upon lateral movement of button 34 in any direction, the plate 36 may move out of parallelism to the cover 39 and thus produce longitudinal movement of the plunger 31. The cover 39 is threaded at 41 on to the end of the housing 30 and a set screw 42 is provided for securing the same in any position, this construction making it possible to adjust the valve member 31 axially to a determined position as explained hereafter.

As will be noted from Figure 6, the plunger 28 is provided with a spool 43 which is slightly smaller in width than the annular pressure groove 44 formed in the sleeve 29. Associated with this groove is a port 45 which is connected by channel 46 to a suitable constant displacement pump 47 having an intake 49 through which fluid is drawn from a reservoir 48. Spaced on opposite sides of the port 45 are two additional ports 50 and 51 to which are connected respectively the channels 52 and 53. The spool 43 serves to divide the incoming flow among these two channels in the proportions determined by the axial position of the spool 43 relative to groove 44. The small spaces 54 and 55 between the spool and the sleeve form in effect hydraulic resistances to the flow of fluid to channels 50 and 51 and when these resistances are equal as shown in Figure 6, the incoming fluid will be equally divided between the channels. Furthermore, these resistances cause a drop in pressure between the port 45 and the channels 52 and 53, and when the valve is in a central position as shown, the drop in pressure in each line will be the same.

If the channels 52 and 53 were assumed to discharge to atmosphere, it will be obvious that the drop in pressure across each resistance would have to be the same irrespective of the axial position of plunger 28, but the volume of flow to these channels would be in accordance with the position of the spool 43. Thus the spool 43 may be utilized to divide the incoming flow among the two outgoing channels in various proportions but it is necessary that the drop in pressure to each branch remain the same for this to be true. The valve 28 is constantly urged toward the right by means of a spring 56 mounted in one end of the housing 30 so as to maintain the end 31 always in contact with the ball 32, and the cover plate 39 is rotated to centralize the spool 32 relative to the annular groove 44. As a matter of fact, the plate is adjusted so that when the tracer button is free, the spool 43 is slightly to the right of the central position, and dependence is placed upon a certain deflection of the tracer by the pattern to move it to the central position. This makes it possible for the tracer in scanning the pattern to respond to depressions in the pattern as well as to eminences thereon, depressions causing the valve 28 to move toward the right gradually reducing space 55 and increasing the resistance thereof, and eminences causing movement toward the left gradually reducing space 54 and increasing the resistance thereof. A tracer control mechanism has thus been provided which is responsive to a very small movement of the tracer to effect a large pressure differential between the two channels.

The channels 50 and 51 are connected to a displacement regulating mechanism which operates in such a manner that the small movement of the tracer is amplified to provide a large movement for varying the displacement of a variable pump and thereby determine the rate and direction of movement of the slide 12. The motor 22 is connected by a closed circuit to a variable displacement pump 57 which may be of any suitable type, that disclosed in Patent No. 1,250,170 issued December 18, 1917 to Hele-Shaw et al., being found satisfactory for present purposes. This pump has two ports 58 and 59 which are connected by channels 60 and 61 respectively to ports 62 and 63 of the motor 22. The pump 57 is of the reversible type whereby it will be seen that when fluid under pressure is delivered to channel 61, the slide will move in one direction, channel 60 then serving as a return channel, and when the pressure fluid is delivered to channel 60 the slide will move in the opposite direction, channel 61 then being a return channel. The pump is provided with a displacement regulator operated by a pair of control rods 64 connected together at opposite ends by plates 65 and when the control rods 64 are in a central position as shown in Figure 7, the displacement of the pump is zero. In other words, there is no eccentric adjustment of the pintle with respect to the pump cylinders and therefore, although the parts may be rotating, there is no flow of fluid.

Operating rods 66 are connected to the plates 65 for effecting adjustment of the pump, movement to the right increasing the flow from zero to maximum in channel 61, channel 60 then serving as a return line, and movement to the left increasing the flow from zero to maximum in channel 60, channel 61 then serving as a return channel. It will thus be seen that longitudinal movement of the rods 66 to the right or left will initiate and increase the flow in either channel 60 or 61 and also determine the direction of movement of the slide 12. Since the movement of the plungers 66 is a considerable amount as compared to the movement of the tracer controlled mechanism, the hydraulic amplification previously mentioned is utilized so that minute movements of the tracer may be suitably magnified to operate the displacement regulator. It will be noted that the hydraulic amplification functions the same as a mechanical leverage mechanism but without the necessity of the tracer developing a large actuating force.

A pair of valve housings 67 and 68 are provided for reciprocably receiving the rods 66, these rods being formed with long tapered ends 69 for cooperating with ports 70 and 71 formed in the valves 67 and 68 respectively. The previously mentioned channels 52 and 53 are connected to these ports respectively and the valve portions 69 will be subjected to the pressure in each channel. These two valves act in the manner of a single balancing valve in the sense that if a greater pressure exists in channel 52 over the channel 53 the rods 66 will shift to the right so as to increase the opening of port 70 and decrease the opening of port 71. This shifting movement will continue until the pressures in lines 52 and 53 equalize thereby insuring an equal drop in pressure through the resistances 54 and 55 even although the volumes flowing through these resistances are unequal. The taper portions are made long and not very steep so that a relatively large movement is necessary to effect a given change in pressure and it is this which makes it possible to amplify the movement of the tracer controlled valve. The ports 70 and 71 are connected by channels 72 and 73 to the common return line 74 leading to the reservoir 48, channel 74 having a check valve 75 therein for maintaining a predetermined back pressure in the lines.

From the foregoing it should now be apparent that the cutter slide is operated by an hydraulic motor which is coupled by means of a locked circuit to a variable displacement reversible pump, the displacement of the pump being in turn controlled through hydraulic amplification by a tracer controlled mechanism whereby slight deflections of the tracer may be utilized to vary the direction and displacement of the pump and thereby in turn change the relative position of the cutter with respect to the work. When the tracer is in a neutral position the volume of the flows through resistances 54 and 55 are equal and the rods 66 will assume the central position as shown in Figure 7 to maintain the pressures in the channels equal. This will result in no displacement of the pump and therefore no movement of the slide 12. The locked circuit comprising the variable displacement pump 57, channels 60, 61 and motor 22 is kept filled with fluid under pressure from pump 47 through check valves 76 and 77 which are respectively inserted between channels 72, 73 and channels 60, 61.

It is desirable that the cutting speed be maintained substantially constant at some predetermined rate and therefore the table motor 17 is not operated at a constant rate because the cutting speed would increase every time the cutter slide was moved in or out simultaneously with the movement of the table. Mechanism has therefore been provided to reduce the rate of movement of the table whenever the cutter slide is moved, whether in or out, so that the resultant relative movement between cutter and work will be at a substantially constant rate. This is accomplished by providing resistances 78 and 79 in the channels 61 and 60 respectively and connecting flow detecting instrumentalities across each resistance so that upon creation of flow in either line to effect cutter slide movement the rate of work table movement will be decreased.

The table motor 17 is coupled by means of a substantially closed circuit to a variable displacement pump 80. This pump is similar in construction to the pump 57 except that it is unidirectional. In other words, means have been provided for limiting the movement of the control rods 64 beyond a neutral position in one direction so that increase in pump displacement is only effected in one direction. For instance, the port 81 of the pump may be considered the pressure port, the port 82 the return port, and channel 83 may be utilized to connect the pressure port to port 84 of the table cylinder while channel 85 may be connected to port 86 to serve as a return line during feed movement. The cross head 87 is arranged in abutting relation to rate control plungers 88 but not positively connected thereto.

These plungers extend through opposite ends of cylinders 89 and have integrally secured thereto the pistons 90. Springs 91 and 92 are mounted upon the plungers on opposite sides of the pistons and within the cylinders so as to maintain the pistons normally in such a position that the control rods 64 will take up a position corresponding to maximum delivery of pump 80. The springs may be inserted in the cylinders under a certain amount of initial tension to insure this result. The end of the pistons 88 may be provided with threaded adjusting members in the form of a pair of lock nuts 93 if additional adjustment is necessary. In addition, a spring 94 may be attached to the cross head 87 to insure contact being made at all times between the cross head 87 and the plungers 88. If so desired, a positive stop 95 may be provided for limiting the maximum displacement of the pump and an additional positive stop 96 may be provided to insure that the adjustment of the pump does not pass beyond the zero position.

The opposite ends of one of the cylinders 89 is connected by channels 97 and 98 to opposite sides of the resistance 78, and the opposite ends of the other cylinder is connected by channels 99 and 100 to opposite sides of the resistance 79. The operation of this flow detecting instrumentality is as follows. If the pump 57 is adjusted to a neutral or no flow position, it will be apparent that the pressure in channels 60 and 61 will equalize throughout and therefore the pressure on both sides of the respective resistances will be the same. In other words, the same pressure should exist throughout the circuit due to the fact that no flow is taking place therein. This pressure will at least be equivalent to that existing in channels 72 and 73 and its minimum will be determined by the check valves 75, 76 and 77. If now it is assumed that the control rods 66 are moved to the right in accordance with a predetermined tracer deflection, a flow will be set up in channel 61. As this flow meets the hydraulic resistance 78, a drop in pressure will occur so that the portion 61' of channel 61 will be at a lower pressure than channel 61 itself. This difference in pressure will be communicated to channels 97 and 98 and due to the fact that the pressure in channel 97 is greater than that in channel 98 the piston 90 will move to the right and withdraw the rate control plunger 88 out of contact with the cross head 87. The flow in channel 61 will cause the piston 24 of the cutter slide to move toward the right and thereby cause a return flow through channel 60 to the pump. When the return flow meets resistance 79, there will be another drop in pressure so that the pressure in channel 100 will be higher than the pressure in channel 99. This difference in pressure will act upon opposite sides of the other piston 90 and cause movement thereof toward the left, thereby moving the control rods 64 to the left and decreasing the rate of displacement of the table feed pump 80. Since the rate of pump displacement has been decreased, it is at once apparent that the rate of movement of the piston 19 and table 10 will decelerate.

Similarly, if the rods 66 are moved to the left, the flow from pump 57 will be delivered to channel 60 and the reverse operation of the pistons 90 will take place, one of them moving forward and the other being retracted to similarly reduce the displacement of pump 80 and the movement of slide 10. It should thus be apparent that acceleration in either direction of the cutter slide 12 will effect a decrease or deceleration in the movement of the work slide 10. There has thus been provided a flow detecting instrumentality which is sensitive to the flow condition in the cutter slide channels so that upon creation of flow in either channel the device will respond in such a manner as to decrease the rate of work movement.

The two variable displacement pumps and the constant displacement pump 47 are driven from a common prime mover as shown in Figure 5. The prime mover 180, which may be an electric motor, is provided with a drive pulley 181, the pulley being connected by a coupling 182 directly to pump 47. The drive shafts of pumps 57 and 80 are coupled together by drive pulley 183 which is operatively connected to pulley 181 by a suitable belt or other power transmitting band 184.

Since the pump 80 is unidirectional, a reversing valve 101 is inserted between the variable displacement pump and the table slide cylinder 18 so that it may be returned by power to starting position. This valve has a pair of ports 102 and 103 which are connected by branch lines 104 and 105 respectively to the return line 85. A second pair of ports 106 and 107 are also provided in the valve housing and connected by channels 108 and 109 respectively to a stop valve 110. This valve has a pair of ports 111 and 112 to which the channels 108 and 109 are respectively connected, and an additional pair of ports 113 and 114 which are connected by channels 115 and 116 to the ports 86 and 84 of cylinder 18. This valve may be of any simple type, the one shown comprising a rotatable member 117 having opposite spaced arcuate grooves 118 and 119 which in the position shown, connect port 111 to port 113 and port 112 to port 114. An operating handle 120 connected to the shaft 121 serves to rotate the member 117 through 90 degrees thereby coupling port 111 to port 112 and short circuiting the variable displacement pump 80, and at the same time locking the fluid in channels 115 and 116.

The reversing valve 101 has a reciprocable plunger 122 on which is formed a plurality of spools 123, 124 and 125. The spools 123 and 124 are so spaced that the annular groove therebetween will connect port 102 to port 106 and the spools 124 and 125 are so spaced as to connect the port 107 with a port 126, this latter port being connected by channel 127 to the pressure line 46. A spring 128 serves to maintain the plunger in the position shown in Figure 7 to maintain the above mentioned connections.

The valve 101 is mounted on the slide 14 as shown in Figure 1 in such a position that the plunger 122 will be engaged by an adjustable stop 129 carried by the slide 12. Upon outward movement of the slide 12 after the finish of a cutting stroke, the stop 129 will engage the plunger 122 and move the same toward the right as viewed in Figure 7. This movement will disconnect port 102 from port 106 and connect the latter port to port 107 thereby interconnecting channels 108 and 109. This movement will also connect port 126 to port 103 thereby permitting the pump 47 to supply make-up fluid to the variable delivery pump 80 through channels 127, 105 and 85. This will effect a rapid return movement of the table 10 in the following manner. The pump 80 will deliver fluid through channel 83 to line 109 at which intersection the fluid will divide apparently, part flowing to one end of the table cylinder through channel 116 and the remainder through ports 107, 106 and channels 108 and 115 to the other end of the cylinder. Although the flow does not actually take place in this manner, the effect is to produce the same unit pressure in opposite ends of the cylinder 10, but due to the fact that the area of the piston 19 is larger on the end next to port 86 than it is on the other, a pressure differential will be created which will cause movement of the table 10 toward the right. The actual flow taking place will thus be in the following manner. Due to the movement of the piston 19, the fluid in the right end of the cylinder must be discharged through channel 116 and this will be combined with the incoming flow from channel 83 to increase the volume being delivered to channel 115. Since the amount being discharged through port 84 is in effect being returned to port 86, the pump only has to supply the deficiency represented by the piston rod and if the flow in channel 83 is maintained at the full capacity of the pump, it will be seen that the movement will be very rapid. This is aided by the fact that the intake 85 to the pump is being supercharged by the constant displacement pump 47. During the rapid return movement therefore fluid will be taken into the closed system from the constant displacement pump 47 and during the feed movement more fluid will be discharged from port 86 than will be absorbed by the cylinder and therefore a certain amount of the oil must be discharged from the system and this is accomplished by interconnecting ports 107 and 126 so that the exhaust fluid is returned through channel 127 to the line 46. This additional discharge into line 46 in combination with that delivered thereto by the pump 47 tends to further increase the volume flowing through the tracer control valve which will add to the sensitivity thereof.

When the machine is utilized for die sinking purposes, it is necessary that a movement in a third direction in addition to the two previously mentioned movements be provided and to this end an elevating screw 130 is journaled at opposite ends in bearings 131 carried by the column for inter-engagement with a nut 132 fixed to the slide 14. The lower end of the screw is provided with a bevel gear 133 inter-meshing with a bevel gear 134 which is mounted for free rotation in a bearing 135 carried by the bed. The opposite end of the gear shaft is provided with clutch teeth 136 for selected engagement with clutch teeth 137 formed on one side of a shiftable collar member 138 splined on a horizontal shaft 139. A spring pressed ball 140 is provided in the collar cooperating with detents 141 formed in the shaft for maintaining the clutch teeth in or out of engagement with one another.

The clutch teeth are interengaged during die-sinking so that the shaft 139 may be automatically rotated from movement of the table to effect intermittent movement of the screw 130 and thereby a cross feed of the slide 14. The shaft 139 extends to the forward part of the bed 11 as shown in Figure 2 where it is provided with a ratchet wheel 142. Mounted on the shaft 139 are a pair of toggle mechanisms 143 and 144 pivotally connected at 145 to the bell crank 146. Each toggle mechanism carries a spring pressed pawl 147 so that upon clockwise movement of the bell crank 146, pawl 147 of toggle 144 will effect rotation of the ratchet wheel 142, and the other pawl will move in a counter-clockwise direction to engage a new tooth. Counter-clockwise movement of the bell crank 146 will cause the pawl 147 of toggle 143 to effect rotation of the ratchet wheel while the other pawl is effecting engagement with a new tooth. It will thus be seen that rotation of the bell crank 146 in either direction will effect indexing of the ratchet wheel. The bell crank is connected to a shifter rod 148 slidably mounted in fixed brackets 149 by a pivot 150. Adjustable collars 151 are mounted on the shifter rod for alternate engagement with a dog 152 fixed to the table 10 so that at each end of the table movement the rod 148 will be shifted and the slide 14 moved a predetermined amount. If indexing only is desired at one end of the table stroke, the appropriate pawl 148 may be removed from engagement with the ratchet wheel.

The bell crank 146 is keyed to the end of a rotatable shaft 153 which extends to the rear part of the machine and is journaled in a bracket 154 and interior of the hub 155 of bevel gear 156 supported by the bracket. The end of the bevel gear hub is provided with clutch teeth 157 for selective engagement with clutch teeth 158 formed on one side of the collar 159 splined on the shaft 153. Spring pressed balls 160 cooperating with detents 161 formed on the shaft serve to hold the collar and thereby the clutch teeth in or out of engagement with one another. The shaft 153 serves to withdraw the tracer control valve at the end of the cutting stroke so as to effect a rapid return movement of the table.

The shaft is connected to the tracer control valve through the following mechanism. A splined shaft 162 is journaled in a bracket 163 fixed to the slide 14 and movable therewith, the lower end of the shaft making a sliding engagement with a bevel gear 164 carried by the bracket 154 and inter-engaging with bevel gear 156. A bevel gear 165 fixed to the upper end of the shaft inter-engages with a bevel gear 166 supported in bracket 163, the gear also being keyed to the end of a horizontal shaft 167. This shaft extends into splined engagement with a pinion 168 journaled in the slide 12 for inter-engaging with a rack member 169, Figure 3. The rack member 169 also engages a pinion 170 mounted on stud shaft 171 to which is keyed the lever arm 172 abutting a shoulder 173 on the end of the tracer valve plunger 28.

From this it should be seen that when the bell crank 146 is oscillated by the dog 152 carried by the table that the shaft 153 will be rotated and thereby, through clutch teeth 157 and 158, effect rotation of shaft 162 through bevel gears 156 and 164 which in turn will effect rotation of the horizontal shaft 167 through bevel gears 165 and 166. Rotation of shaft 167 will cause the rack member 169 to oscillate the lever 172 in a direction to effect withdrawal of the tracer control plunger. The tracer control valve will be moved to a position causing pump 57 to effect withdrawal of the cutter slide 12 from the work and pattern. To insure that the tracer control plunger remains in this position during the rapid return movement of the table, when utilizing a cycle involving the same, a detent mechanism has been provided comprising a pivoted pawl 174 selectively engageable with detents 175 formed on the boss 176 keyed to shaft 171.

The slide 12 will continue its outward movement until the stop 129 engages plunger 122 to shift the reversing valve and cause a rapid return movement of the table. This rapid return movement will continue until the dog 152 engages the collar at the opposite end of shifter rod 148 to reposition the parts for a forward feed movement.

By means of the pawls 147 and the two clutch collars 138 and 159, it is possible to set up the machine for either profiling or diesinking operations. When diesinking by the reciprocating cycle method where the cut is made in both directions, the collar 159 will be moved out of engagement thereby maintaining the tracer always in contact with the pattern during movement in both directions. It will be evident that during this cycle the clutch collar 138 will be engaged and both pawls 147 will be utilized.

If the cycle is a oneway cycle, that is, a cutting in one direction and a rapid return movement in the opposite direction, only one of the pawls 147 will be utilized and both clutch collars 138 and 159 will be adjusted to the engaged position.

When profiling operations are performed requiring no indexing movement, the clutch collar 138 will be disengaged and the clutch collar 159 will be engaged so as to permit an automatic cycle to be performed, stoppage after one complete cycle of operation being effected by the stop valve 120.

There has thus been provided a pattern controlled machine tool having an improved transmission and control mechanism therefore composed of a relatively few number of parts which are simple in construction and easy to adjust and a machine which may be set up for various operating cycles in accordance with the work to be produced.

That which is claimed is:

1. In a pattern controlled machine tool having a pair of transversely movable slides for effecting relative movement between a cutter and work in a path corresponding to the contour of a given pattern, the combination of power actuable devices for moving said slides, a tracer for scanning the pattern, mechanism actuable by the tracer in response to variations in the pattern for determining energization of one of said devices, and means responsive to the flow of power to said energized device for controlling actuation of the second device and thereby movement of its connected slide.

2. In a pattern controlled machine tool having a pair of transversely movable slides for effecting relative movement between a cutter and work in a path corresponding to the contour of a given pattern, the combination of independent motors coupled to the respective slides, a tracer for scanning the pattern, mechanism controlled by the tracer for determining the rate of energy flow to one of said motors, and means responsive to changes in said rate for effecting an inverse change in rate of the second motor.

3. A pattern controlled machine tool having a first slide for supporting a tracer and cutter, a second slide for supporting a pattern and work in cooperative relation with respect to the tracer and cutter, means for determining the relative velocities of the two slides and thereby the direction of resultant movement effected thereby comprising individual motors connected to each slide, a source of power therefor, tracer controlled means responsive to variations in the pattern for determining the rate of power flow to one motor and thereby its velocity, and means responsive to changes in said rate for determining the velocity of the second motor.

4. A pattern controlled machine tool having a first slide for supporting a tracer and cutter, a second slide for supporting a pattern and work in cooperative relation respectively to the tracer and cutter, means for determining the relative velocities of the two slides and thereby the direction of resultant movement between the cutter and work comprising individual slide motors, one of said motors being reversible, a source of power, tracer controlled means responsive to variations in the pattern for determining the rate of power flow and the direction of movement of said reversible motor and means responsive to changes in said rate for determining the rate of movement of the other motor whereby the directional components of the two motors will determine the resultant direction of relative movement between cutter and work.

5. In a pattern controlled machine tool having a pair of transversely movable slides for effecting relative movement between a cutter and work in a path corresponding to the contour of a given pattern, the combination of means for effecting a continuous movement of one slide in a given direction at a predetermined maximum rate, a tracer for scanning said pattern, means controlled by the tracer for effecting reciprocatory movement of the other slide transverse to the direction of movement of the first slide, and means responsive to movement of the reciprocatory slide to reduce the rate of said continuously moving slide.

6. In a pattern controlled machine tool having a pair of transversely movable slides for effecting relative movement between a cutter and work in a path corresponding to the contour of a given pattern, the combination of means for effecting a continuous movement of one slide in a given direction at a predetermined maximum rate, a tracer for scanning said pattern, means controlled by the tracer for effecting reciprocatory movement of the other slide transverse to the direction of movement of the first slide, means responsive to movement of the reciprocatory slide to reduce the rate of said continuously moving slide, and means effective upon stoppage of the reciprocatory slide to increase the rate of the continuously moving slide to its maximum.

7. In a pattern controlled machine tool having a pair of transversely movable slides for effecting relative movement between a cutter and work in a path corresponding to a given pattern, the combination of means for effecting a continuous movement of one slide in a given direction at a predetermined maximum rate, a tracer for scanning said pattern, means responsive to tracer deflection for initiating movement of the other slide in a direction transverse to the first slide, means responsive to progressive increase in tracer deflection to progressively increase the rate of transverse movement to decrease progressively the rate of movement of the continuously moving slide.

8. In a pattern controlled machine tool having a pair of slides movable in transverse paths for effecting relative movement between a cutter and work in a path corresponding to the contour of a given pattern, the combination of fluid operable devices for moving said slides, a tracer for scanning the pattern, a source of fluid pressure, a pair of channels extending therefrom to one of said devices, means controlled by the tracer for determining the rate of flow in said channels, additional pressure means for actuating the other device, and means responsive to the rate of flow in said pair of channels and effective on said additional pressure means for determining the rate of actuation of said last named device.

9. A pattern controlled machine tool having a cutter, a work slide, means for actuating said slide, a relatively movable pattern and tracer, means controlled by the tracer for determining the direction of relative movement between cutter and work including a fluid operable motor for effecting relative movement between cutter and work in a direction transverse to the direction of movement of the work slide, a source of pressure, a pair of channels extending therefrom to the motor, said channels being alternately working and return channels, means controlled by the tracer for determining the working channels, and means responsive to flow in the return channel to vary the rate of movement of said work slide.

10. A pattern controlled machine tool having a movable slide for supporting a pattern and work, an additional slide for supporting a cutter and tracer for movement transversely thereof, a fluid actuable motor coupled to each slide, means controlled by the tracer in response to variations in the pattern for determining the relative velocities of said motors and thereby the direction of resultant movement between cutter and work including means for normally delivering a maximum flow to one motor, additional means for delivering a reversible flow to the other motor, fluid operable means controlled by the tracer for determining the volume and direction of said reversible flow, and means responsive to increase or decrease in said volume to inversely increase or decrease the volume of flow to said work slide motor.

11. A pattern controlled machine tool having a pair of slides movable in transverse paths for effecting relative movement between a cutter and work in a path corresponding to the contour of a given pattern, a fluid operable motor connected to one of said slides, a variable displacement pump for supplying fluid to said motor, tracer controlled means for determining the displacement of said pump and thereby the rate of actuation of said motor, a second hydraulic circuit including a motor and a second variable displacement pump for determining the rate of movement of the other slide, and means responsive to increase or decrease in displacement of the first pump for inversely varying the displacement of the second pump.

12. A pattern controlled machine tool having a first slide for supporting a work piece and pattern, a second slide movable transversely of the first slide for supporting a tracer and cutter, a locked hydraulic circuit including a motor and variable displacement pump for effecting operation of the cutter slide, a second hydraulic circuit including a pump and motor for determining operation of the work slide, means in the locked circuit under control of the tracer for determining the volumetric flow therein, and means responsive to changes in said volumetric flow for inversely varying the volumetric flow in the second circuit.

13. A pattern controlled machine tool having a first slide for supporting a work piece and pattern, a second slide movable transversely of the first slide for supporting a tracer and cutter, a locked hydraulic circuit including a motor and variable displacement pump for effecting operation of the cutter slide, a second hydraulic circuit including a pump and motor for determining operation of the work slide, means in the locked circuit under control of the tracer for determining the volumetric flow therein, means responsive to changes in said volumetric flow for inversely varying the volumetric flow in the second circuit, and an additional pump for maintaining a predetermined minimum pressure in said locked circuit.

14. A pattern controlled milling machine having a work slide, means to support a pattern thereon, a cutter slide movable transversely of the work slide, means to support a tracer thereon in cooperative relation to the pattern, a first hydraulic circuit for effecting movement of the cutter slide including a motor and a variable displacement pump, tracer controlled means for determining the displacement of said pump and thereby the volumetric delivery to said motor, a second hydraulic circuit for effecting operation of the work slide including a motor and a second variable displacement pump, means responsive to changes in the volumetric flow in the first circuit for varying the displacement of said second pump including a rate control plunger, means to normally maintain said plunger in a position corresponding to maximum flow of said second pump, and flow responsive means associated with the first circuit for shifting said plunger to decrease the volumetric output of said second pump.

15. A pattern controlled milling machine having a pair of slides movable transversely of one another, means to support a work piece and pattern in one of said slides, means to support a cutter and tracer in the other slide, a fluid circuit for operating one of said slides including an hydraulic motor, a variable displacement pump, a pair of channels coupling the pump to the opposite ends of said motor, tracer controlled means operative on the pump for causing an alternate delivery of working fluid to said channels to effect reverse operation of the connected slide, a second hydraulic circuit for operating the other slide including a fluid operable motor and a variable displacement pump, means responsive to flow variations in the first circuit for inversely controlling the rate of flow in the second circuit including a pair of displacement control plungers, means for normally maintaining said plungers in a position corresponding to maximum flow of the second pump, means coupling the plungers respectively to the channels of the first circuit, flow responsive means in each channel for effecting operation of said plungers, said means being effective when the channel is a working channel to cause plunger retraction and when the channel is a return channel to effect advance of the plunger and means responsive to the advancing movement of either plunger to decrease the volumetric delivery of said second pump.

16. A pattern controlled machine tool having a pair of transversely movable slides for effecting relative movement between cutter and work, a relatively movable pattern and tracer for controlling the direction of said relative movement, a first hydraulic circuit for effecting operation of one of said slides including a motor and a reversible variable delivery pump, a second hydraulic circuit including a motor and a non-reversible variable delivery pump for effecting operation of the second slide, the rate and direction of delivery of the first pump being controlled by the tracer, manually operable means effective on the tracer for positioning said reversible variable delivery pump to a position causing retraction of the associated slide after completion of a cutting stroke, a reversing valve interposed between the non-reversible pump and its associated motor for changing the direction of flow thereto, and means carried by the first slide upon completion of its retracted movement to effect shifting of the reversing valve and thereby a subsequent return of the remaining slide.

17. A pattern controlled machine tool having a work slide, means to support a pattern thereon, a cutter slide movable transversely of the work slide, means to support a tracer thereon in cooperative relation to the pattern, a first hydraulic circuit for effecting movement of the cutter slide including a reversible motor and a reversible variable delivery pump, a second hydraulic circuit including a reversible motor and a non-reversible variable delivery pump for effecting movement of the work slide, tracer controlled means for determining the rate and direction of delivery of the first pump and thereby movement of its control slide, means responsive to variations in flow in the first circuit to inversely determine the rate of flow in the second circuit, manually controlled power means for positioning the reversible variable delivery pump to cause return of the cutter slide after completion of a cutting stroke, and means controlled by said returning slide to subsequently effect return of the work slide.

18. In a machine tool having a pair of slides for effecting relative movement between a work piece and a cutter in a plurality of directions in a given plane, the combination of separate fluid operable means connected to each slide, a variable delivery pump coupled to one of said means, remote control means for varying the delivery of said pump and thereby the rate of operation of one of said slides, a second variable delivery pump coupled to the other slide, and means automatically responsive to change in the rate of delivery of the first pump for inversely changing the rate of delivery of the second pump.

19. In a machine tool having a slide, a fluid operable motor connected to the slide for effecting translation thereof, a variable delivery pump for supplying fluid to said motor at various rates, the combination of means for remotely controlling the delivery of said pump including a pair of oppositely extending members connected to the pump and movable for varying the displacement thereof, a valve associated with each member having an intake and delivery ports, formed means carried by each member and movable thereby relative to said delivery ports to vary the hydraulic resistance to fluid escape therethrough and thereby the pressures on the ends of said members, a common source of pressure for supplying fluid to said intake ports, and means to vary the pressures at said intake ports to cause shifting of said members to vary the displacement of said pump, said shifting movement continuing until the resistances of said outlet ports of the valves have been re-apportioned to equalize the pressure on opposite ends of said members.

20. In a machine tool having a slide, a fluid operable motor connected to the slide for effecting translation thereof, a variable delivery pump for supplying fluid to said motor at various rates, the combination of means for remotely controlling the delivery of said pump including a pair of oppositely extending members connected to the pump and movable for varying the displacement thereof, a valve associated with each member having an intake and delivery ports, formed means carried by each member and movable thereby relative to said delivery ports to vary the hydraulic resistances to fluid escape therethrough and thereby the pressures on the ends of said members, a common source of pressure for supplying fluid to said intake ports, means to vary the pressures at said intake ports to cause shifting of said members to vary the displacement of said pump, said shifting movement continuing until the resistances of said outlet ports of the valves have been re-apportioned to equalize the pressure on opposite ends of said members, said last named means including a valve remotely located with respect to said pump having hydraulic resistance therein shiftable to vary the drop in pressure from a common supply in different proportions among said channels.

21. In a pattern controlled machine tool having a pair of slides for effecting relative movement between a cutter and a work piece, a combination of separate fluid operable means for translating each slide, each of said means including a variable displacement pump, a common control means for determining the ratio of pump displacements including a tracer, a pattern supported by one of said slides for governing the tracer, and a fluid control circuit operable upon predetermined deflection of the tracer by the pattern to inversely adjust said pump displacements to change the resultant direction of movement of the slides.

22. In a pattern controlled machine tool having a plurality of slides for effecting relative movement between a cutter and a work piece, the combination of separate fluid motors for the respective slides, a first means for delivering an operating flow to one motor, a second means for delivering an operating flow to the other motor, and a common control including a tracer operatively connected for inversely varying the volume of said flows for determining the resultant direction of movement effected by the slides.

23. In a pattern controlled machine tool having a pair of slides for supporting a cutter and a work piece respectively, fluid operable motors for moving the respective slides, independent means for delivering an operating flow to the respective motors, and a common control including a tracer, a pattern adapted to deflect the tracer to an operating position, and means operatively connecting the tracer for determining the volumetric ratios of said flows to cause movement in a first direction, said means being operable upon increased deflection of the tracer by the pattern to change said volumetric ratios to cause movement in another direction which will relieve the over-deflection of the tracer.

24. In a milling machine, a slidable carriage, a rotatable cutter carried by said carriage, a work table movable relative to said carriage and provided with a master, fluid operable means for moving said carriage and work table including variable displacement pumps and a tracer mechanism having a tracer which follows the contour of said master for controlling the displacement of said pumps so that the work on said table will be cut in conformity with the outline of said master.

25. In a milling machine a slidable carriage, a rotatable cutter carried by said carriage, a work table movable relative to said carriage and provided with a master, a series of fluid motors for operating said carriage and work table, a series of variable displacement pumps for controlling said motors, a tracer mechanism carried by said carriage with the tracer of said mechanism in contact with said master, and means operated by said tracer mechanism for controlling said variable displacement pumps and thereby the direction of relative movement between the work and cutter so that the work is outlined in conformity with the outline of the master.

26. In a milling machine a slidable carriage, a rotatable cutter carried by said carriage, a work table movable relative to said carriage and provided with a master, a tracer carried by said carriage and in contact with said master, fluid operable motors for moving said carriage and table, variable displacement pumps for controlling said motors, a primary valve operated by said tracer, and a control circuit commanded by the primary valve for adjusting the proportionate displacements of said variable delivery pumps.

27. In a milling machine a slidable carriage, a rotatable cutter carried by said carriage, a work table slidable transversely of said carriage and provided with a master, individual fluid motors for operating said carriage and work table, a tracer mechanism carried by said carriage, means for urging said tracer into contact with said master, individual variable displacement pumps for supplying fluid to said motors, and means controlled by the tracer for varying the displacement of said pumps so that the work on said table will be outlined by said cutter in conformity with the outline of said master.

28. In a milling machine having a slidable carriage, a rotatable cutter carried by said carriage, and a work table movable transversely of said carriage and provided with a master, the combination of fluid operable means for shifting said carriage or work table, individual variable displacement pumps for said motors, fluid operable means for varying the displacement of said pumps, a control valve mechanism for said means, a tracer mechanism carried by said carriage, means for urging said tracer into contact with said master, and an hydraulic circuit activated by said tracer mechanism for controlling the valve mechanism and thereby determining the direction of relative movement between the cutter and work so that the work is outlined in conformity with the outline of the master.

29. In a milling machine, a slidable carriage, a rotatable cutter carried by said carriage, a work table slidable transversely of said carriage and provided with a master, a tracer carried by said carriage in contact with the master, fluid operable motors for transmitting motion to said carriage and table, individual variable delivery pumps connected with the respective motors, a control valve operated by said tracer, fluid operable means under control of said valve for varying the ratio of pump displacements and thereby the direction of relative movement between the cutter and work.

30. A reproducing device comprising a movable pattern and a movable work piece whereon the pattern is to be reproduced, means under the command of the pattern for operating upon the work piece comprising a tool, a fluid motor commanding the tool, a variable displacement pump commanding the motor, and means to control the displacement of the pump including a fluid control circuit having valve means connected to be controlled by the movement of the pattern.

BERNARD SASSEN.